Feb. 19, 1929.　　　　　　　　　　　　　　　1,702,575
F. D. S. ROBERTSON
METALLURGICAL APPARATUS AND PROCESS
Filed April 21, 1921
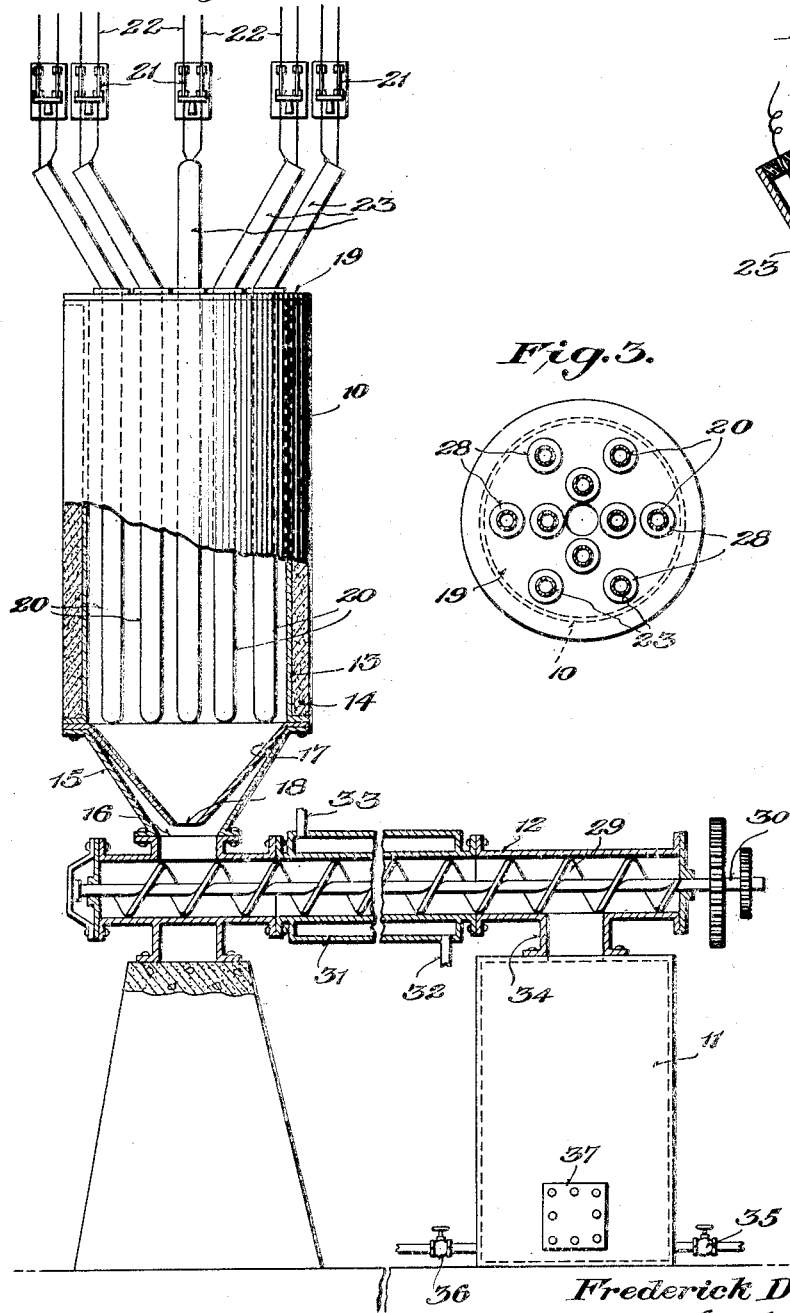
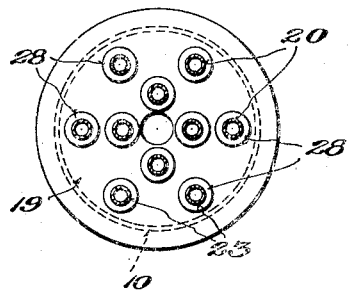
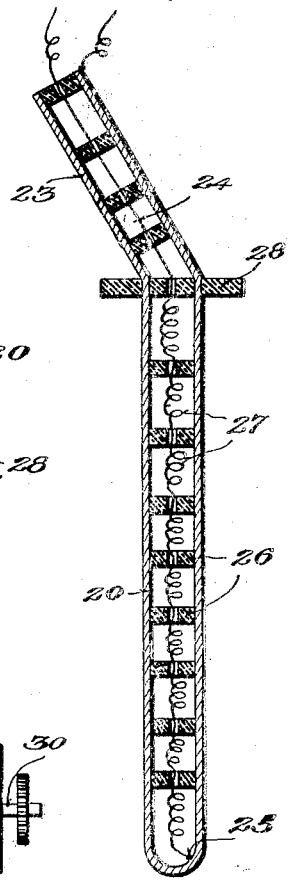
Inventor
Frederick D. S. Robertson,
Witness:-

Patented Feb. 19, 1929.

1,702,575

UNITED STATES PATENT OFFICE.

FREDERICK DUNCAN STRUAN ROBERTSON, OF TORONTO, ONTARIO, CANADA, ASSIGNOR, BY MESNE ASSIGNMENTS, TO FARLEY G. CLARK.

METALLURGICAL APPARATUS AND PROCESS.

Application filed April 21, 1921. Serial No. 463,162.

This invention relates to metallurgical apparatus and processes; and it has to do more particularly with a process of and apparatus for systematically subjecting reducible metallic compounds, especially oxids, either as such or in the form of ore, to the action of a gaseous reducing agent under efficiently controllable application of the heat required for properly accomplishing the reduction, such reduction occurring most desirably at temperatures low enough to avoid complete fusion of the resultant reduced material.

Reduction of ores, oxids, and the like, at relatively low temperatures by means of gaseous reducing agents has been proposed heretofore; but, so far as I am aware, no thoroughly satisfactory procedure or apparatus for carrying out the treatment under optimum operating conditions has been devised prior to my invention. Lack of sufficiently accurate control of the applied heat, both as regards its intensity and distribution through the mass of ore or other material being treated, together with lack of proper provision for systematic handling and disposal of the material at all stages of the process, are among the defects inherent in such prior proposals.

Accordingly, the important objects sought by the present invention, and attained as hereinafter more fully disclosed, include novel provisions, in both process and apparatus, whereby the foregoing and other difficulties of the prior art are overcome, the conduct of metallurgical operations of the general character described is simplified, systematized, and rendered more dependable, and certain substantial economies are effected. Other objects and advantageous features of the invention will appear as the description proceeds.

For the sake of a concrete example useful in explaining the underlying principles of the invention, certain specific embodiments of process and apparatus, found to possess important practical advantages, are described hereinafter in detail. It is to be understood, however, that these typical embodiments are selected merely for purposes of illustration; and that the invention is not limited to the specific details described but is defined in the appended claims.

Generally described, the process here chosen to illustrate the principles underlying the process side of the invention is one in which the reduction is effected at temperatures below the point of complete fusion of the reduced ore; the necessary heat is applied at distributed localities within the mass of material undergoing treatment, in such manner as to favor uniform heating of the mass; the material, in more or less granular or pulverulent condition, is caused to advance through the heating and reducing zone; and the resultant reduced product is cooled, or is allowed to cool, in an environment protecting it against oxidation.

The apparatus of the invention is, in general, characterized by the provision of a reaction chamber having disposed therewithin heating means, most desirably comprising a plurality of elongated electrical resistance heating elements, so arranged as not to obstruct or impede substantially the progress of material through the reaction chamber; a closed receiver; and most desirably also cooling means in the form of a suitably housed conveyor device for delivering reduced material to said receiver, operatively associated with said reaction chamber; together with a source of reducing gas supply, most desirably so arranged that the reducing gas travels in counter-current with respect to the material passing through the apparatus.

While my invention includes the complete association of chambers and auxiliary devices already referred to in general terms, it also comprises, as indicated by the claims hereto appended, certain sub-combinations and features of details whose utility is not limited to the specific association in which they are described.

Both process and apparatus will be more readily understood by reference to the accompanying drawings, wherein:

Fig. 1 is a more or less diagrammatic representation, in side elevation, of typical apparatus within the invention, parts being shown broken away and in section;

Fig. 2 is a sectional view on a larger scale, of one of the electrical resistance heating elements employed in the heating chamber or furnace illustrated in Fig. 1; and Fig. 3 is a top plan of the furnace, partly in section.

In the drawings, which disclose one form of apparatus suited, for example, to the production of a reduced material resembling iron sponge in some respects, 10 designates generally a reaction chamber or furnace portion of the apparatus; 11 is a receiving chamber into which reduced material may be discharged from the reaction chamber or furnace 10 without exposure to the oxidizing action of the atmosphere; and 12 designates generally cooling and conveying means which is desirably interposed between 10 and 11 to provide for reducing the temperature of the material after it leaves the furnace chamber and before it enters the receiving chamber. The reaction chamber or furnace 10 may be of any construction suitable for the purposes in view. In this instance the furnace is of the vertical shaft type and comprises a cylindrical metallic shell 13, surrounded by an insulating jacket or mantle 14. The lower or discharge end of the furnace chamber is formed as a conical hopper 15, providing a contracted outlet 16 through which reduced material may be discharged. Where it is desired still further to diminish the effective size of the discharge outlet, a supplemental conical or hopper shaped fitting 17 may be employed inside of the member 15 as here shown, thus giving a considerably smaller effective discharge outlet 18 by which the rate of discharge can be cut down to the point desired. The furnace equipment may include several of these inner hoppers or lining plates 17 having different size discharge apertures and interchangeable, so that the furnace can be readily adapted for use with different kinds of granular material.

On the top of the furnace shaft rests a plate or framework 19 that has a central opening through which material may be charged into the furnace or a bar can be introduced to knock down "bridges" or like obstructions whenever necessary.

For controllable heat treatment of the charge within the furnace chamber, elongated resistance heating means are disposed vertically therein. In the present example, such heating means comprise a plurality of relatively long resistor devices 20 suspended in parallel spaced relation from the plate or spider 19. For use in a furnace of this character, said resistor devices should be constructed to withstand the abrasive action of the descending charge. They should also be so spaced, as indicated more particularly by the horizontal plan view Fig. 3, as to secure proper distribution and comparative uniformity of heating effect throughout the body of the charge within the furnace shaft. This arrangement, in which the axes of the elongated heating elements extend in the direction in which the heated charge travels, interposes the minimum interference with free passage of the charge through the furnace, and at the same time ensures effective application of the heat units supplied by the resistors. It is desirable that the heating means as a whole be susceptible of ready regulation at all times with respect to the rate of ore feed, flow of reducing gas and velocity of the reducing action. Accordingly, in the construction here illustrated, current may be supplied to or cut off from each of the resistors individually by suitable means such as separator knife switches 21 provided in the respective pairs of leads 22 by which power is supplied to the heating elements from suitable current mains. While the invention in its broader aspects is not limited to any particular construction for the individual resistors or heating elements, they should most desirably be of the internal resistance type, that is, of the type in which the resistance element proper is shielded from direct contact with the charge. The construction here illustrated has important practical advantages and is especially recommended. In this construction, each resistor element comprises an iron tube or pipe 23 closed at the bottom and having its upper portion bent at an angle for a purpose to be explained hereinafter. A resistance wire 24 having one end grounded to the pipe 23 as indicated at 25 is threaded through centrally apertured insulator members 26 which serve to space the resistance wire from the inner walls of the iron pipe. The sections of wire between the successive pairs of insulators 26 may be coiled as indicated at 27 to give the necessary heating capacity. It will be seen that one of the before mentioned leads 22 is connected to the upper end of the iron pipe, while the other is connected to the resistance wire 24. As here shown, each resistor device is provided with an external insulating collar 28 at the point where the iron pipe is bent, said collar bearing upon the supporting plate or spider 19, whereby the resistors are suspended with their major portions hanging down vertically within the furnace shaft, while their upper portions project upwardly through the plate 19 and incline radially outward to allow free access to the central charging opening in said plate. The bent upward extensions of the pipes 23 further serve not only to mechanically protect the resistance wire enclosed therein, but they also ensure the coolness and safety of the connections of the entire resistance unit to the current supply mains.

The cooling and conveying mechanism connected to the lower end of the vertical shaft furnace in the typical apparatus here illustrated should be of such length as to enable the hot reduced material to be cooled to the desired extent before it is deposited in the receiver 11. To this end it may consist of any desired number of cylindrical flanged sections suitably connected end to end as shown. Within the housing thus formed is the helical or screw conveyer and agitator 29 carried by shaft 30, which is mounted on suitable bearings and driven in any appropriate manner. One or more sections of the housing may be provided with a cooling jacket 31 having a cooling water inlet 32 and outlet 33.

The discharge outlet 34 of the conveyer and agitator housing leads directly into the top of the receiver 11, as shown. This receiving chamber may be of any convenient size and shape. At some convenient point, as at 35, for example, it is provided with a valved inlet for introduction of hydrogen or other reducing gas. A valved outlet is provided at 36.

In employing the novel apparatus to carry out the process of the invention as applied to the treatment, for example, of an iron ore for production of a sintered metallic material somewhat resembling iron sponge, the ore, preferably comminuted to about pea size, is fed into the top of the furnace chamber 10, and the hydrogen or other reducing gas which ordinarily need not be carefully purified is allowed to enter the system through pipe 35. The reducing gas employed may be supplied at any suitable pressure, a gauge pressure of 10 pounds per square inch being typical and commonly suitable. During the initial passage of the reducing gas into the system the outlet pipe 36 may be temporarily open to facilitate exit of air from the receiver 11 by displacement downward. As soon as a test of the gas escaping from the top of the furnace chamber 10 indicates that substantially all air has been swept out of the system, the gas escaping at the top of the furnace may be ignited and the heaters 20 thrown into operation by closing their respective knife switches, the entire number of heaters being advantageously employed during the warming up of the charge. The most advantageous temperature at which to operate will naturally be determined in part by the character of the ore or other material to be reduced and the rapidity with which it is desired to operate. In practice temperatures of from 650° to 1000° C. are suitable for the reduction of iron ores. When the desired operating temperature has been attained, the flow of hydrogen should be suitably regulated by manipulation of the valve in the supply pipe 35 in order to ensure the passage through the charge of a sufficient excess of the reducing gas. The attainment of the proper conditions in this respect is indicated by the height of the flame with which the excess reducing gas burns at the top of the furnace shaft, a flame height of about six inches being usual under typical operating conditions.

The conveyer and agitator in the cooling housing 12 having been set in operation, material is conveyed at a controllable rate of speed from the discharge hopper at the lower end of the furnace shaft to the receiver 11. It is evident that in starting up the furnace, the first part of the material discharged from the furnace will be that originally placed within the conical bottom 17 and is therefore not likely to have been sufficiently heated for proper reduction. This portion should be withdrawn from the receiver through clean-out door 37, or otherwise, and charged back into the top of the furnace. Subsequent material discharged from the furnace is in more or less granular sintered condition and comprises completely reduced spongy iron in company with unfused gangue constituents, the material as a whole being more or less friable in character and readily transferable by the conveyer means 29 from the lower end of the furnace shaft to the receiver, being cooled en route by the counter-flowing current of hydrogen, carbon monoxid, water gas, or other reducing gas continuously supplied through the inlet 35. Hydrogen is an especially desirable reducing gas for the purposes in view and its use is recommended. By the time the reduced material has been deposited in the receiver 11, its temperature has been reduced considerably. If necessary, it may be still further cooled by allowing it to remain for the necessary length of time in the receiving chamber 11. It may be withdrawn from time to time through the manhole or clean-out door 37, the employment of the reducing gas under pressure rendering it practicable to do this without discontinuing operations. Unless cooled before being exposed to atmosphere, the reduced iron ore oxidizes very readily and even with considerable violence in the case of the pyrophoric product obtained when pulverulent ore is reduced.

Operating in the manner described upon a hematite containing 52.4 per cent iron, it is possible to obtain substantially 100 per cent recovery in reduced iron associated of course with gangue constituents of the ore from which it may be easily separated in a melting furnace of any suitable character. For this purpose a Heroult 3-phase tilting furnace can be advantageously employed, and the content of impurities or alloying substances present in the iron, such as phosphorous, silicon, manganese, etc. which are little influenced by the reduction treatment above described, may be reduced or modified by methods well known in the art and a product thus obtained which is suitable for casting or for manufacture of special steels. It is to be understood, that the hot reduced material discharged from the furnace shaft may pass directly into a melting furnace without the intermediate cooling described in the detailed example of the process herein given, proper precautions being taken in that case to prevent access of air to the pyrophoric material during its transfer to the melting furnace.

Although the component parts of the described apparatus may obviously be constructed of any size necessary for a desired capacity, it may be noted that for an apparatus in which the furnace can accommodate readily a charge of from 1500 to 2000 pounds of ore at once, the chamber 10 may have a height of six feet, and the cooling and agitating chamber a length of about eight feet, other dimensions being approximately in the proportion shown in the drawing, except that a diameter of one inch is found satisfactory for the iron pipes 23. In a typical instance, each of these pipes may, for an apparatus of the dimensions indicated, contain some thirty-seven feet of 18-gauge nichrome wire or equivalent resistance of any preferred character; and ten such resistor members may be used.

While I have described my novel apparatus mainly with reference to its use as a complete organization for the reduction of ores, it is to be understood not only that various parts are deemed to have an independently patentable status but also that various features thereof may be modified or otherwise employed without departing from the scope of the invention. Similarly, the novel method is not restricted to the specific details disclosed in the foregoing typical example, chosen to illustrate the principles of the invention. For example, under certain circumstances, the use of water gas as a reducing agent may be even more advantageous than the use of hydrogen.

What I claim is:

1. In metallurgical apparatus, a reaction chamber, heating means therefor comprising an elongated internal resistance heating element so arranged as not to obstruct substantially the advance of the charge in contact therewith, and a receiver adapted to the exclusion of air from contact with the treated product.

2. In metallurgical apparatus, a reaction chamber, heating means therefor comprising an elongated internal resistance heating element so arranged as not to obstruct substantially the advance of the charge in contact therewith, a receiver adapted to the exclusion of air from contact with the treated product, and cooling means interposed between said reaction chamber and said receiver.

3. In metallurgical apparatus, a reaction chamber, heating means therefor comprising an elongated internal resistance heating element so arranged as not to obstruct substantially the advance of the charge in contact therewith, a receiver adapted to the exclusion of air from contact with the treated product, and means for causing a reducing gas to fill said receiver and said reaction chamber.

4. In metallurgical apparatus, a reaction chamber in substantially the form of a shaft through which material may descend, and a plurality of separately regulable elongated resistance heating elements extending therein in substantially the direction of such descent.

5. In metallurgical apparatus, the combination, with a shaft-like reaction chamber having a hopper-shaped terminal portion providing a discharge outlet, of a supplemental hopper-shaped member supported within said terminal portion and restricting the effective size of said discharge outlet, said supplemental member being optionally removable to permit operation of the chamber with the fullsize discharge outlet.

6. In metallurgical apparatus, the combination, with a shaft-like reaction chamber having a hopper-shaped terminal portion providing a discharge outlet, of a supplemental hopper-shaped member supported within said terminal portion and restricting the effective size of said discharge outlet, and means for regulating the descent of material through said outlet, said supplemental member being optionally removable to permit operation of the chamber with the fullsize discharge outlet.

7. In metallurgical apparatus, a reaction chamber, heating means therefor comprising an elongated internal resistance heating element so arranged as not to obstruct substantially the advance of the charge in contact therewith, and an apertured conical bottom provided with a lining having a smaller aperture.

8. In metallurgical apparatus, a cooling chamber for the transfer of a reduced product, a product-receiving chamber connected therewith and provided with means for the introduction of a reducing gas, an exit for atmospheric air, and means permitting the reducing gas to enter the cooling chamber.

9. In metallurgical apparatus, a reaction chamber, heating means therefor comprising an elongated internal resistance heating element so arranged as not to obstruct the advance of the charge in contact therewith, and a receiving chamber for the product provided with an inlet for reducing gas and an outlet for said gas to the reaction chamber.

10. In metallurgical apparatus, a reaction chamber in substantially the form of a shaft, an apertured conical element at the bottom of said shaft provided with a lining element having a smaller aperture, and a receiving chamber provided with an inlet for reducing gas and with an outlet to said smaller aperture.

11. The method of treating ores which comprises heating the same without melting, thereafter cooling the product while conveying it to a receiving chamber, and meantime causing a reducing gas to advance from the receiving chamber throughout both a quantity of material which is being cooled and a quantity which is being heated.

In testimony whereof I hereunto affix my signature.

FREDERICK DUNCAN STRUAN-ROBERTSON.